United States Patent [19]

Cheng

[11] Patent Number: 4,989,152
[45] Date of Patent: Jan. 29, 1991

[54] METHOD OF FINDING THE SURFACE INTERSECTIONS AND THE SHORTEST DISTANCE BETWEEN TWO ARIBTRARY SURFACES

[76] Inventor: Koun-Ping Cheng, P. O. Box 9364, Rancho Santa Fe, Calif. 92067

[21] Appl. No.: 274,421

[22] Filed: Nov. 21, 1988

[51] Int. Cl.$^5$ .............................................. G06F 15/46
[52] U.S. Cl. ........................... 364/474.24; 364/474.29
[58] Field of Search ............ 364/518, 522, 191, 474.24, 364/474.29; 318/569, 570, 573

[56] References Cited

U.S. PATENT DOCUMENTS

| | | | |
|---|---|---|---|
| 4,677,576 | 6/1987 | Berlin, Jr. et al. | 364/522 |
| 4,700,398 | 10/1987 | Mizuno et al. | 382/1 |
| 4,755,927 | 7/1988 | Kishi et al. | 364/130 |
| 4,764,878 | 8/1988 | Tanaka et al. | 364/474 |
| 4,821,214 | 4/1989 | Sederberg | 364/522 |
| 4,851,986 | 7/1989 | Seki et al. | 364/191 |
| 4,855,927 | 8/1989 | Seki et al. | 364/474.29 |

Primary Examiner—Jerry Smith
Assistant Examiner—Paul Gordon

[57] ABSTRACT

To find the intersection curves of the two given surfaces, is required in many operation such as NC machining and solid geometric modeling surface creation. Normally, the intersection of two surfaces is not unique. In order to generate a proper tool path or to create a correct boundary surface, all the intersection curves must be found.

A new method of finding all the intersection curves of two surfaces has been developed. This new method is based on the use of a plane vector field VF induced by the two given surfaces. The system constructs the 2D vector field VF and uses the integral curves of VF to locate the first intersection curve SC. After the first intersection curve has been found, the system locates all the initial points on SC. Then, it follows the connecting curves of the initial points to locate the other intersection curves. Furthermore, the initial points on the newly found curves will lead the system to other intersection curves. By following all the connecting curves, the system will find them all. Once all the intersection curves are found, the system is able to select the desired tool path or construct the correct surface.

Additionally, the absolute distance d between two surfaces can be calculated by using the same method. The value d is used for checking the clearance of moving a cutter along a tool path.

9 Claims, 8 Drawing Sheets

METHOD OF FINDING THE SURFACE INTERSECTIONS AND THE SHORTEST DISTANCE BETWEEN TWO ARIBTRARY SURFACES

BACKGROUND OF THE INVENTION

A. Field of the Invention

The present invention relates to solid geometric modeling system that are used for computer aided geometric design and computer aided manufacturing, and more particularly to methods of using a computer for calculating the intersection curves of two surfaces to facilitate the creation of correct NC data and the creation of new boundary faces.

B. The Prior Art

With the adventure of computers, computer aided design and computer aided manufacturing (CAD/CAM) became a subject of widespread interest. Since the 1960's, a lot of research and development have been conducted in this area. Recently, most of the research are directed toward the development of a solid geometric modeling system with boundary representation.

Figure 7A:
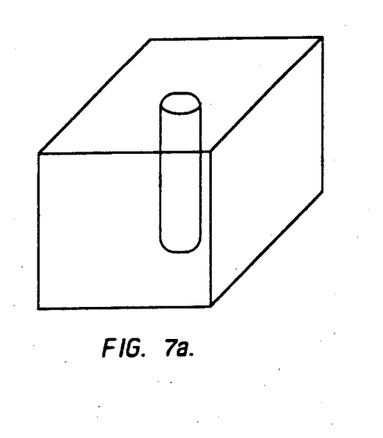
FIG. 7a is a diagram of a hole inside a block.
Figure 7B:
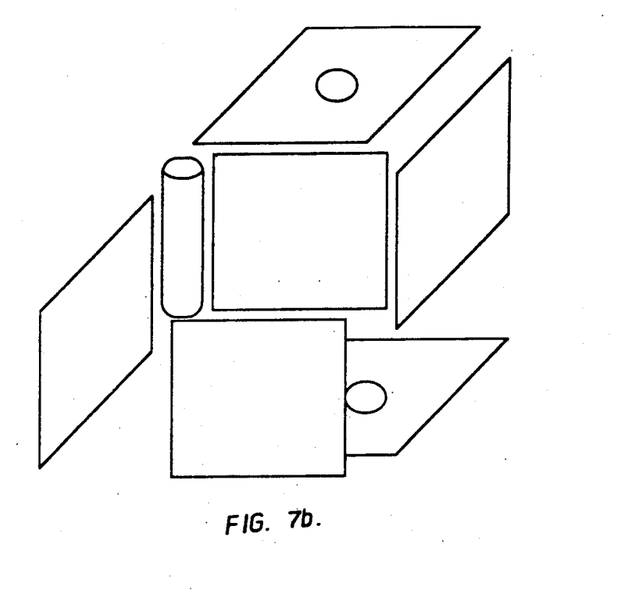

A solid geometric modeling system is a computer graphic system which is used to create solid objects. After an object is created, there are different ways to represent this object in a computer. If the system constructs and stores all the geometric information of the boundary surfaces of the object, then it is called a solid modeling system with boundary representation. The stored boundary information is called the boundary file of the solid. FIG. 7b represents a typical boundary file of a solid geometric modeling system.

Figure 8A:
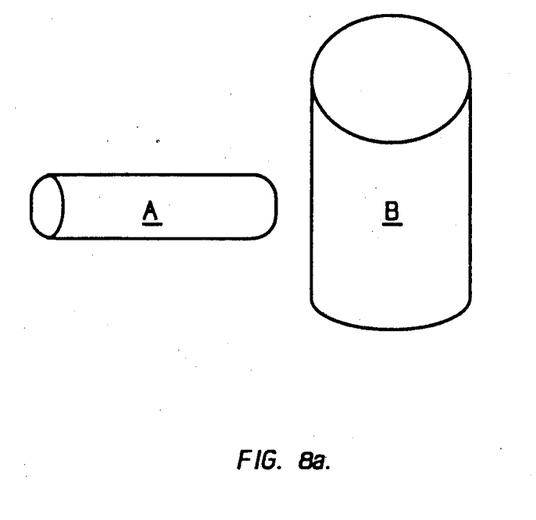
FIG. 8a represents two cylinders.
Figure 8B:
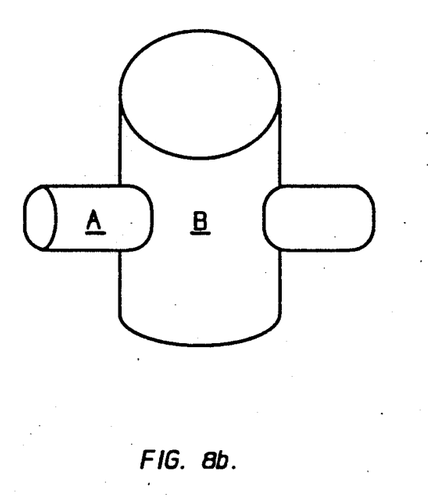
Figure 9A:
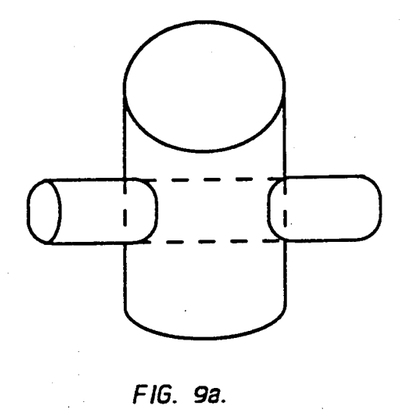
FIG. 9a is the union of two cylinders.
Figure 9B:
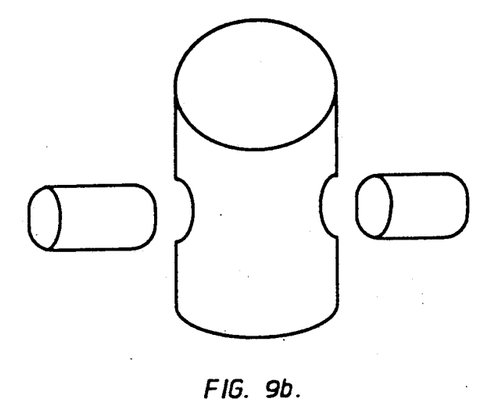

There are also different ways to create a solid object. The most commonly used method is to combine simple primitives together to form a more complicated object. The set (Boolean) operations such as union intersection and difference are used for the combination. FIG. 8b illustrates the union operation performed by a solid geometric modeling system. In order to combine two objects A and B and calculate its boundary, the intersections of the boundary surfaces of A and B must be calculated. FIG. 9a shows the object before the boundary file is constructed and FIG. 9b shows the constructed boundary file. Hence, finding the intersection curves of two boundary surfaces, becomes a fundamental tool in constructing the boundary file of an object. Furthermore, once an object (or a part) is constructed (modeled), the boundary file stored in the database can be used to compute the cutter paths of a numerical controlled (NC) machine. And the computed data is used to drive the machine and produce the part automatically. In general, a cutter path of a NC machine is a curve C which lies on a boundary surface S of the part. And C can be defined as the intersection of two surfaces. One of the surface is S and the other is an offset surface of the boundary.

In the case of two complex surfaces, it is important to find all the intersection curves. Otherwise, the new boundary surface constructed by the set operation will not be correct and the target NC tool path may be missed in the automatic generation process. In generating a tool path, it is also important to check the position of the cutter such that at each step the cutter will not run into the surface and destroy the part. The distance (clearance) between the cutter surfaces and the boundary surfaces must be calculated at each step to insure the cutter is keeping a distance from the part.

Figure 1:
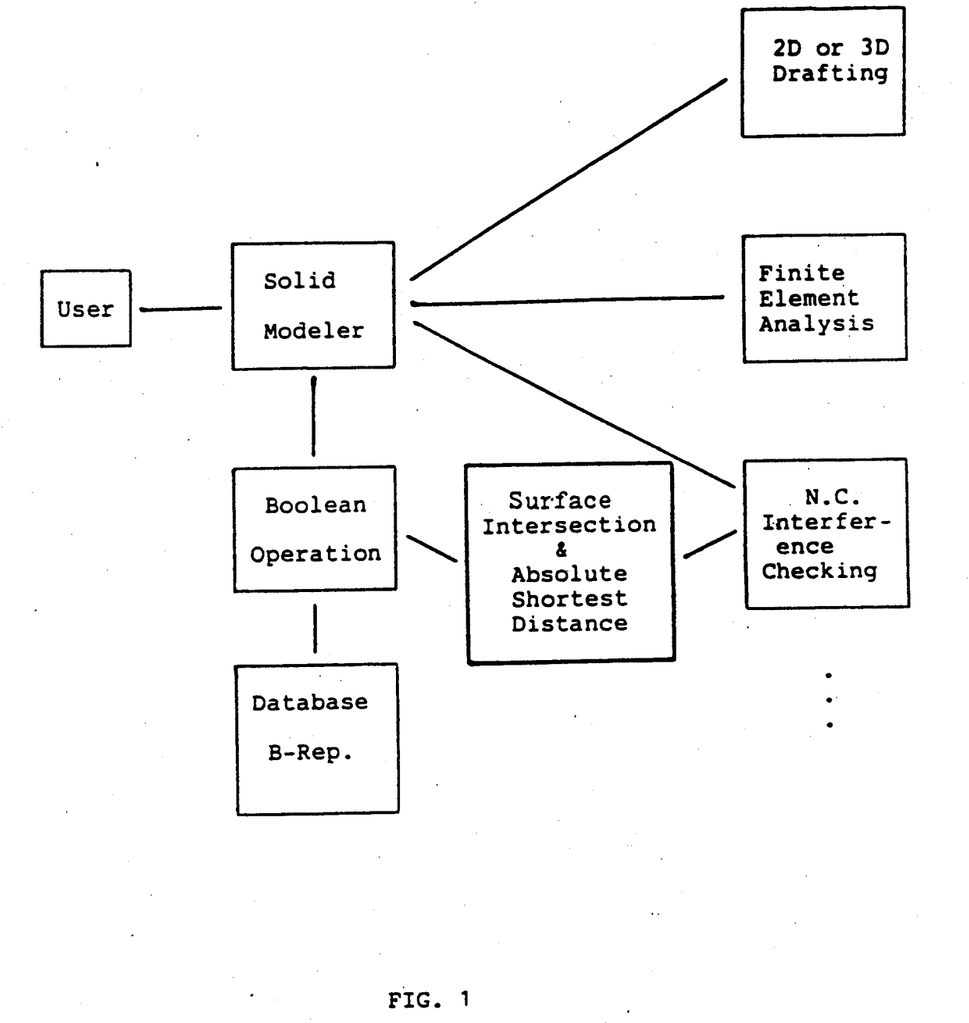
FIG. 1 is a functional block diagram that schematically illustrates conventional solid geometric modeling system, in which surface/surface intersection methodology appears in bold block.

FIG. 1 gives the overall structure of a solid geometric system with boundary file representation. The center bold block contains surface/surface intersection processor and distance finder. It performs multiple functions, including (1) to support the Boolean operation to construct the boundary file, (2) to generate the NC cutter path, (3) to check the clearance of the cutter motion and others.

The most difficult part in using a computer to calculate the surface/surface intersections is to find all the intersections without missing any curves and also without loosing the performance of the system. However, a closed form solution does not exist for the general surface/surface intersection problem. Also, the power series expansion (or the algebraic approximation) of a general surface at a local point cannot describe the entire surface. The global structure of the two surfaces must be known in order to locate all the intersection curves.

Figure 10:
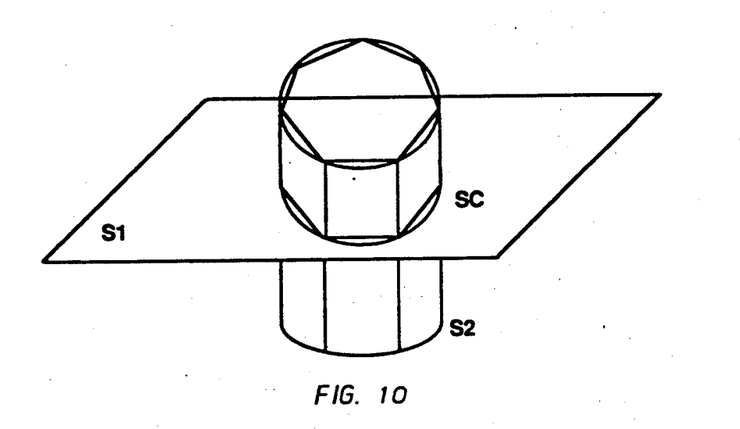
FIG. 10 is the intersection of a plane and the polygon approximation of a cylinder used to show the method of finding intersections of two surfaces by using polygon approximation method.

There are many different ways to solve this problem. For example, see "Surface/Surface Intersection Problems", M. J. Pratt & A. D. Geisow, 1987. A reasonable approach is to use polygons to approximate the two surfaces and use computer to calculate the rough intersection curves. In FIG. 10, the cylinder is approximated by a set of planes. Then the intersection curve of the two surfaces is approximated by the intersections of the planes. This approach will work for many cases, but unfortunately it may fail to obtain the tangent curves or touching points or small intersection curves. This is due to the fact that by using the polygon approximations, the computer cannot obtain local detail information of the two given surfaces within finite steps and decompositions Other widely accepted methods such as using subdivision method or using uv-curves of the first surface to intersect the second surface, have the same deficiency.

OTHER PUBLICATIONS

M. J. Pratt & A. D. Geisow, "Surface/Surface Intersection Problems" in "The Mathematics of surfaces", J. A. Gregory, ed., Oxford: Clarendon pp 117-142, 1987.

P. Shinha, E. Klassen & K. K. Wang, "Exploiting Topological and Geometric Properties for Selective Subdivision", ACM, 1985.

E. Lee, "Surface/Surface intersections", presented at summer meeting, July 1984, Seattle Wash.

M. A. Kransnosel'skiy, A. I. Perov & M. Aleksandrovich, "Plane Vector Fields", New York, Academic Press, 1966.

SUMMARY OF THE INVENTIONS

The objective of the present invention is to provide a method of using a solid modeling system to find all the intersection curves of two arbitrary surfaces for constructing the boundary file of the system. This method is reliable, fast in computer computation time and free from the above-mentioned draw back encountered in the conventional method.

Another important objective of the present invention is to provide a method of using a solid modeling system to calculate the absolute shortest distance between two surfaces for clearance checking in NC machining.

In order to achieve this object, the present invention provides a method of using a solid modeling system for constructing a vector field VF, finding an intersection curve or relative minimum point to start the method, finding initial points of the intersection curve or relative minimum point, finding new intersection curves or relative minimum points from the initial points, repeating this method until no intersection curves or relative minimum points can be found and finally, searching the boundary edges of the uv-planes for possible intersection curves or relative minimum points.

BRIEF DESCRIPTION OF THE DRAWING

Reference is next made to a brief description of the drawings.

FIG. 2a and 2b illustrate the meaning of singular points of a plane vector field and the connecting curves between singular points.

FIG. 7b is the boundary representation of a solid geometric modeling system of the object described in FIG. 7a.

FIG. 8b represents the union of the two cylinders in FIG. 8a. FIG. 8a and 8b are used to show the union operation defined by a solid geometric modeling system.

FIG. 9b is the boundary representation of FIG. 9a.

FIG. 13b are the induced equal height curves of FIG. 13a.

DESCRIPTION OF THE PREFERRED EMBODIMENT

The present invention provides a method of using computer to find all the intersection curves or the absolute shortest distance of two arbitrary surfaces Methodologies of finding all the intersection curves, creating NC tool paths and checking the motion of the cutter will be introduced after a brief description of the standard terminologies which is necessary for understanding the method. For example, see "Plane Vector Fields" by M. A. Kransnosel'skiy, 1966.

Part A: Terminologies:

(1). Parametric Surfaces of a Boundary File.

In most solid geometric modeling systems, the boundary surface of an object is represented as a parametric surface. A 3D surface S is called a parametric surface, if it has the form $$S(u,v) = (x(u,v), y(u,v), z(u,v)),$$

where $0 \leq u, v \leq 1$ and S is a one-to-one function on the interior of the unit square. And this unit square is called the uv-plane of the surface S. All the surfaces mentioned in this article, are parametric surfaces with C1 continuous condition (i.e. the first derivative of the surface S exists).

Since there are differences between the 3D space and the 2D uv-plane of a parametric surface, in the following sequel the capital P (or T) is used to represent a point in the 3D space and the small case p (or t) is used to represent a point in the uv-plane.

Figure 11:
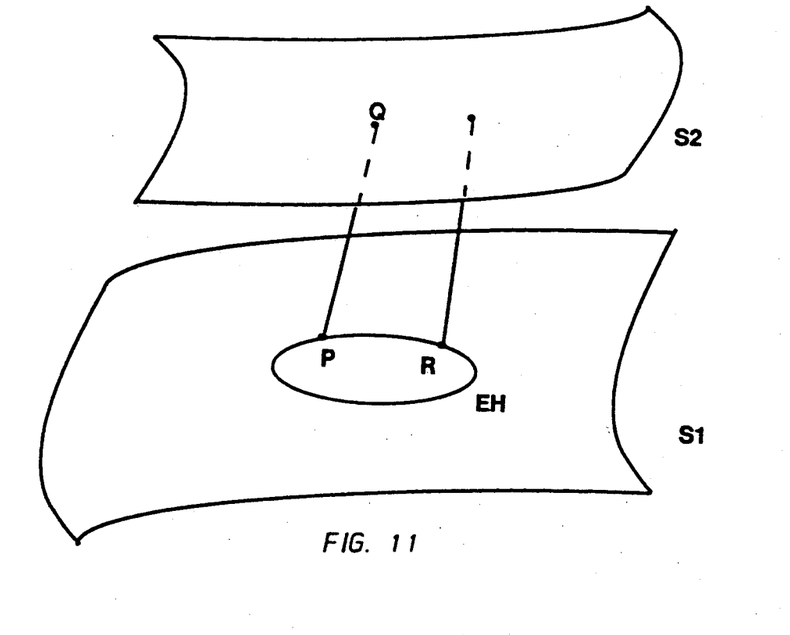
FIG. 11 is the shortest distance from point P on S1 to surface S2 and the equal height curve of S1 passing through P.

(2) Shortest Distance, Intersection and Minimum Pair. Let S1 and S2 be two surfaces of a solid geometric modeling system. Let p be a point of the uv-plane of S1. Let $P = S1(p)$ be the image of p on the surface S1. If there exists a point Q on S2 such that PQ gives the shortest distance from P to S2, then (P, Q) is called the shortest distance (corresponding) pair of P. In FIG. 11 points P and Q represent a shortest distance pair.

If the distance between P and Q is zero, then (P, Q) is called an intersection pair.

Although, PQ gives the shortest distance from P to surface S2. In general, PQ does not give the shortest distance from surface S1 to surface S2 in the neighborhood of P. If PQ also gives the shortest distance from S1 to S2 in the neighborhood of P, then (P, Q) is called a minimum pair.

(3) Equal Height Curves.

Let S1 and S2 be two surfaces of a solid geometric modeling system. Let P be an arbitrary point of S1 and Q a point on S2 such that (P, Q) is the shortest distance pair of P. Let d be the distance between P and Q. A curve EH of S1 passing through P is called an equal height curve, if for any point R of EH the distance from R to S2 equals d. FIG. 11 shows an equal height curve EH which passes through the point P. Note that as a special case, the intersection curves $$SC_j, j=1,2,\ldots,n$$

of S1 and S2 are also equal height curves with distance d equal to 0.

(4). Equal Height Curves of a uv-plane.

Let S1 and S2 be two surfaces of a solid geometric modeling system. Let EH be an equal height curve of S1 such that the distance from EH to S2 is d. Note that two different equal height curves of S1 have two different distances. Hence, the set of all equal height curves of S1 can be represented as $$\{EH_d, d \in R \text{ (real numbers)}\}$$

Figure 13A:
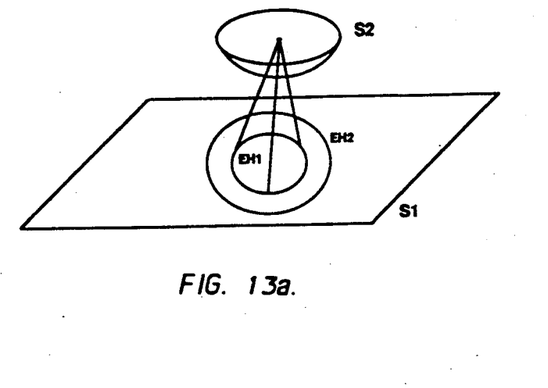
FIG. 13a are the equal height curves from a plane to a sphere.

Since S1 is a parametric surface, $\{EH_d\}$ induces a set of curves on the uv-plane UVP of S1. Let {UVEHd, d∈R} be the induced curves. Then, {UVEHd} is called the induced equal height curves on the uv-plane of S1. FIG. 13a illustrates the equal height curves from a plane S1 to a sphere S2 and FIG. 13b shows the induced equal height curves on the uv-plane of S1.

(5). Orthogonal Components of Equal Height Curves.

Use the same notation as (4). Consider all the 2D curves in the uv-plane of S1 which are perpendicular to {UVEHd}. Then this set of curves forms an orthogonal dual system of {UVEHd} and is denoted as {OGr, r∈R}

Figure 13B:
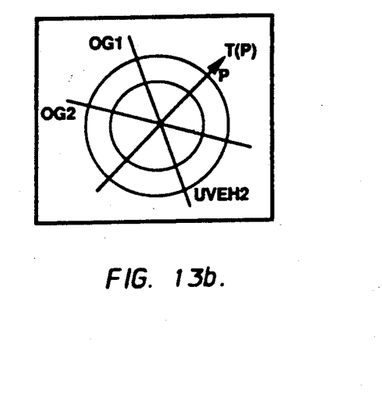

In FIG. 13b OG1, OG2 and OG3 belong to the orthogonal components of induced equal height curves.

(6). Vector Field VF induced by {OGr}.

Use the same notation as (5). Let UVP be the uv-plane of S1. Let p be a point of UVP, OGh be the curve of {OGr} which (see FIG. 13b). Then for every point p of UVP, we can define T(p) as the vector which is associated with p. By considering all the points of UVP and the vectors associated with the points, the set {T(p), p∈UVP} defines a plane vector field VF on UVP. And VF is called the induced vector field of the orthogonal components of the equal height curves from S1 to S2.

(7) Master and Slave surfaces.

Let S1 and S2 be two surfaces of a solid geometric modeling system. Note that in constructing the vector field VF, the role of S1 and S2 is interchangeable. If the vector field VF is constructed on the uv-plane of S1, then S1 is called the master surface and S2 is called the slave surface. On the other hand, if a vector field is constructed on the uv-plane of S2, then S2 is called the master surface and S1 is called the slave surface.

(8). Integral Curves, Singular Points and Connecting Curves. Let S1 and S2 be two surfaces of a solid geometric modeling system. Let VF be the vector field constructed in (6). A curve IC in the uv-plane of S1 is called an integral curve of VF, if for any point p of IC the tangent vector of IC at p is equal to the vector VF(p) at p. From the construction of VF the orthogonal components {OGr} constructed in (5) are the integral curves of VF.

Figure 2A:
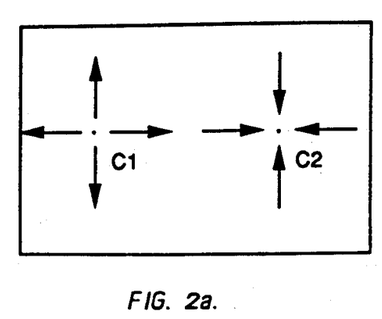
FIG. 2a are 2 singular points in a plane vector field.
Figure 2B:
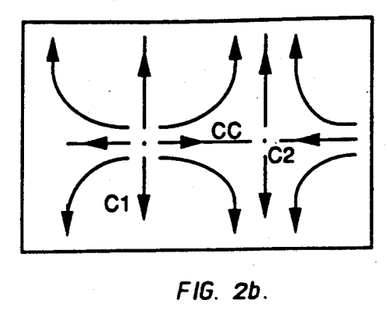
FIG. 2b is a connecting curve between two singular points.

A point p of the uv-plane of S1 is called a singular point of VF, if the vector VF(p) at p is either zero or undefined. Let CC be an integral curve of VF. CC is called a connecting curve, if CC "connects" two singular points C1 and C2 of VF. In FIG. 2a, C1 and C2 are two singular points of a vector field. In FIG. 2b, CC is a connecting curve between two singular points.

(9) Crossing Vector VEC.

Let S1 and S2 be two surfaces of a solid geometric modeling system. Let P be a point of S1 and (P,Q) the shortest distance pair of P. A crossing vector VEC(P) at P is defined as

Figure 4A:
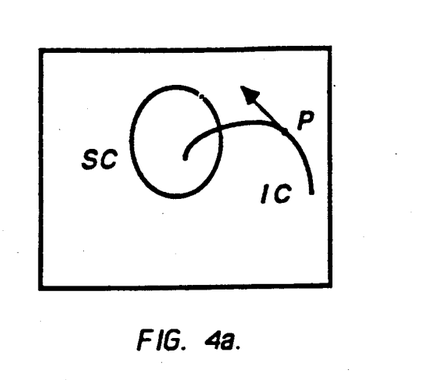
FIG. 4a is the uv-plane of the plane in FIG. 4b.
Figure 4B:
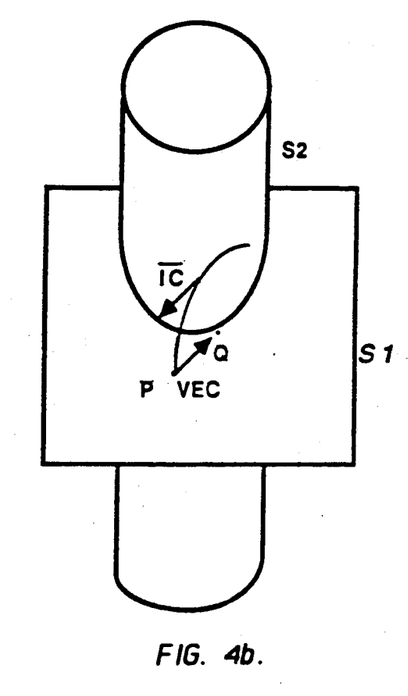
FIG. 4b is the intersection of a plane and a cylinder used to show a method of detecting an intersection curve of two surfaces. The constructed vector VEC(P) changes direction after the processor marches over the intersection curve.

VEC(P)=Q−P.

FIG. 4b illustrate the vector VEC(P). In FIG. 4b (P, Q) is the shortest distance pair of P and VEC(P) is the vector from P to Q.

Part B Methodologies (a) Method of constructing the vector field VF.

Let S1 and S2 be two surfaces of a solid geometric modeling system and VF the vector field constructed in (6). The equations of VF can be described as follows.

Let p be a point of the uv-plane of S1, P the image of p and (P, Q) the shortest distance pair of P. Then the vector field VF at p is given as:

$$VF(p)u = \delta S1/\delta u(P) \cdot N2(Q)$$

$$VF(p)v = \delta S1/\delta v(p) \cdot N2(Q),$$

where (1) VF(p)u and VF(p)v are the u and v components of the vector VF(p) at p, (2) δS1/δu(P) and δS1/δv(P) are the partial derivatives of S1 at P and (3) N2(Q) is the surface normal of S2 at Q. Hence, based on the two equations listed above the vector field VF can be constructed by the system. Once the vector field is constructed, the next step is to detect intersection curves.

(b) Method of Detecting Intersection Curves.

Consider the two intersecting surfaces S1 and S2 as described in FIG. 4b. The uv-plane of S1 is described in FIG. 4a in which SC is the intersection curve of S1 and S2 and IC is an integral curve of the vector field VF constructed in (6). In FIG. 4b, P is the image of p lying on the image of IC and Q is the point on S2 such that (P, Q) is the shortest distance pair of P. It is easy to see that the crossing vector VEC at the image P of p changes direction when p marches across the intersection curve SC along the curve IC.

Hence, by marching along an integral curve IC of the vector field VF, an intersection curve is detected whenever the direction of the crossing vector VEC(P) is changed. Note that the above method of detecting an intersection curve SC of S1 and S2 can be applied to all curves which intersect SC, in addition to an integral curve IC of VF.

So far, only the well intersected curves are considered. In the event an intersection curve is deformed, the following method needs to be adopted.

(c) Method of Detecting Touching Points or Relative Minimum Points.

Let S1 and S2 be two surfaces of a solid geometric modeling system. IF S1 and S2 are just touching at a point T, then the touching point T can not be detected by using the same method described in (b), since the crossing vector VEC(P) does not change direction when P marches across the point T. A different method must be considered.

Figure 5A:
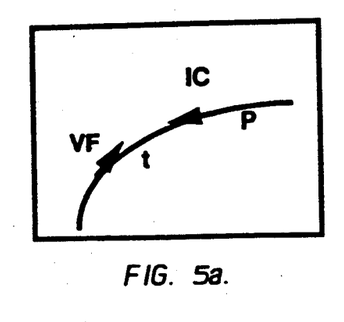
FIG. 5a is the uv-plane of the plane in FIG. 5b.
Figure 5B:
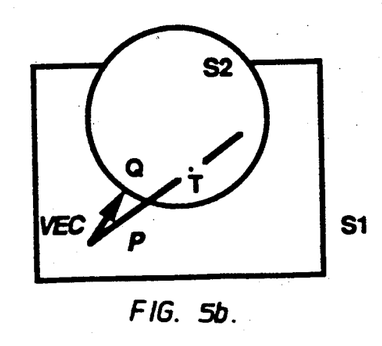
FIG. 5b is the intersection of a plane and a sphere used to show a method of detecting a touching or a relative minimum point of two surfaces. The vector VF(P) changes direction after the processor marches over the touching or the relative minimum point.
Figure 6:
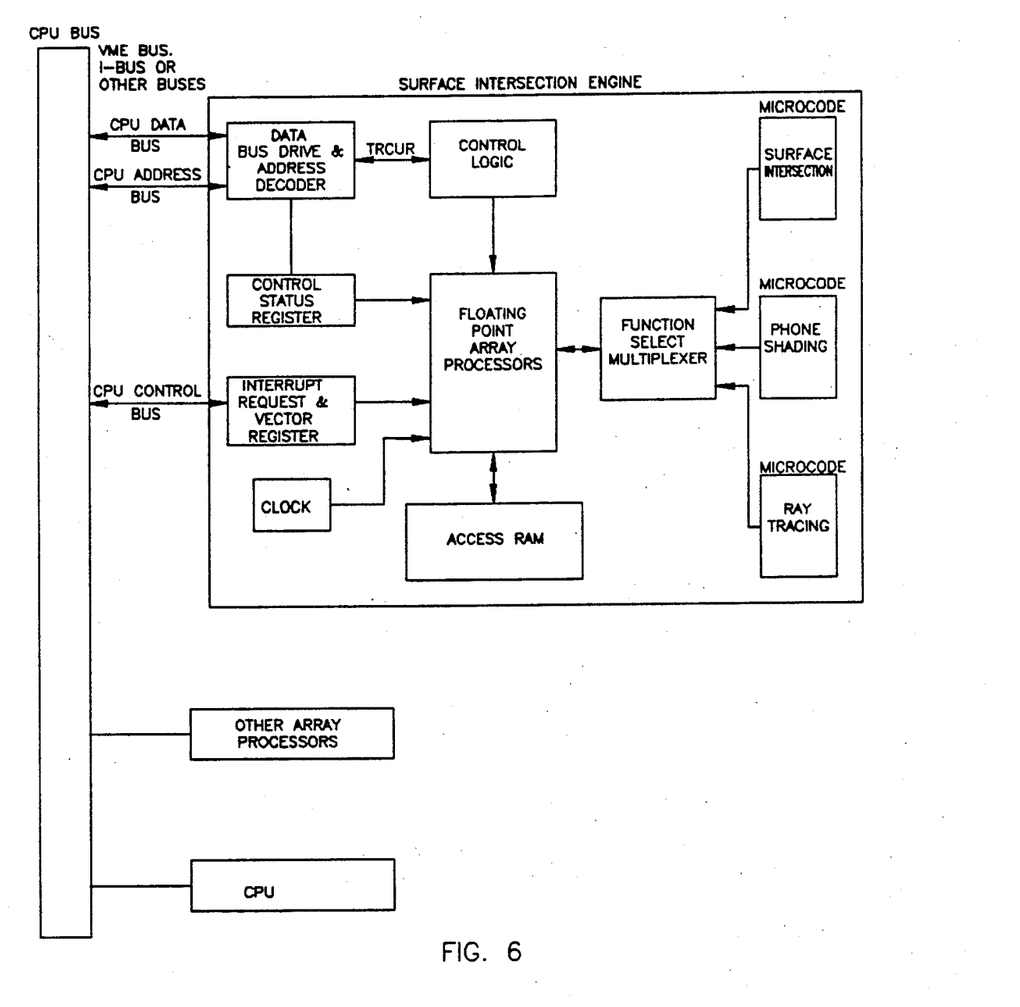
FIG. 6 is a hardware implementation of this method.

In FIG. 5b, S1 is a plane and S2 a sphere of a solid geometric modeling system. S1 and S2 are touching at a point T. As P marches across the touching point T, the crossing vector VEC at the point P approaches to a vertical vector and it does not change direction. However, In FIG. 5a, the vector field VF constructed in (6) changes direction as the point p marches across t.

Hence, by marching along an integral curve IC of the vector field VF, a touching point of S1 and S2 can be detected whenever the direction of the vector VF is changed.

Other cases such as: (1) two surfaces are tangent at a curve, (2) two surfaces intersect at a small curve or (3) the intersections of the two surfaces are close to each other, can all be detected in a similar way.

(d) Method of Calculating Intersection Pairs and Intersection Curves.

After an intersection curve is detected in (b) or (c), it is a standard procedure to locate an intersection pair (P,Q) of S1 and S2 and use the intersection pair (P,Q) to trace out the entire intersection curve. For example, see "surface/surface intersection" by E. Lee, 1984. This standard method will not be stated in this article.

(e) Method of Calculating Equal Height Curves.

The calculation of equal height curves is a necessary step in the methodology of finding all the intersection curves. The methodology of calculating intersection curves can be adopted in the calculating of equal height curves, since an intersection curve is only a special case of an equal height curve.

(f) Method of Finding all the Intersection Curves.

Let S1 and S2 be two surfaces of a solid geometric modeling system and VF the vector field constructed in (6). A most important property of the vector field VF can be stated as follows:

If VF is continuous, then the intersection curves of S1 and S2 are connected by connecting curves through intermediate singular points of VF.

Figure 3A:
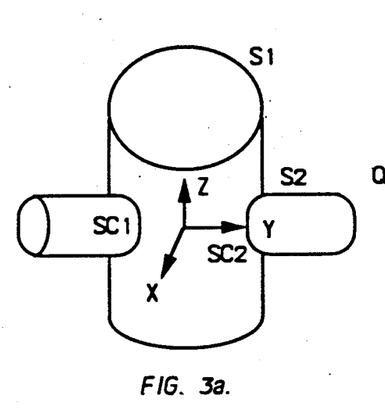
FIG. 3a is the intersection of a large and a small cylinder at the right angle.
Figure 3B:
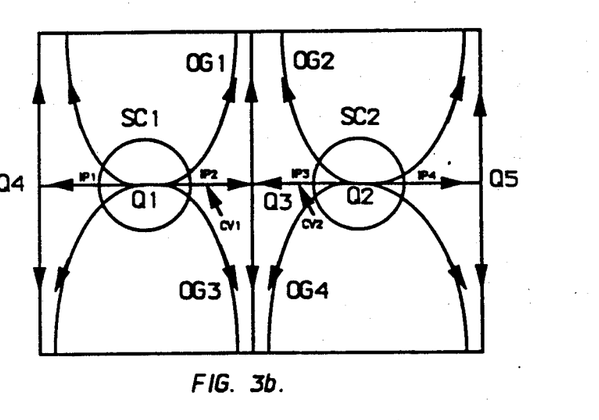
FIG. 3b is the uv-plane of the larger cylinder used to illustrate the vector field VF and the properties induced by VF constructed by this method.

Consider the two intersecting cylinders in FIG. 3a. FIG. 3b illustrates this property of VF. In FIG. 3b, SC1 and SC2 are the two intersection curves of S1 and S2. Q3 is a singular point between SC1 and SC2. There are two connecting curves CV1 and CV2 which connect SC1 and SC2 through the point Q3.

Figure 12:
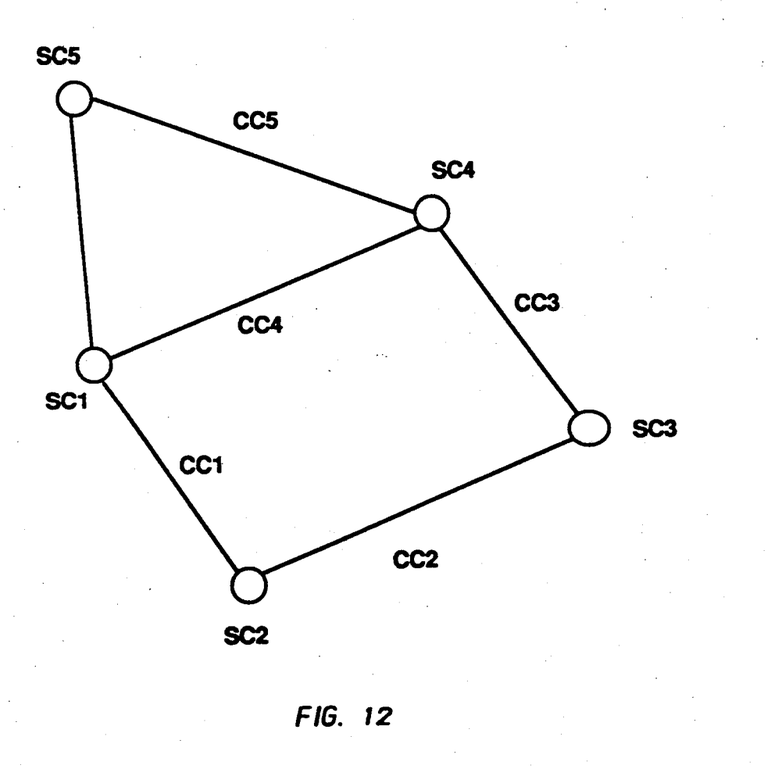
FIG. 12 is the graph tree of the intersection curves.

Hence, if the intersection curves are considered as nodes of a graph and connecting curves are considered as connecting arrows, then the intersection and connecting curves form a graph tree GT. And GT is called the global structure of the intersection curves generated by VF. FIG 12 illustrates a possible structure of GT.

Conceptually, if one intersection curve is found by the system, then it is equivalent to a node found in the graph tree GT. Furthermore, the system can follow the connecting curve in GT from one node to the other nodes. By exhausting all the connecting curves in GT, the system can find all the notes in the tree (i.e. all intersection curves of S1 and S2). However, in practice, two nodes in the graph tree are connected physically through initial points of the intersection curves. The following is a description of the definition and method of locating initial points.

(g) Method of locating initial points of an intersection curve or an equal height curve.

Let S1 and S2 be two surfaces of a solid geometric modeling system and VF the vector field constructed in (6). Let SC be an intersection curve of S1 and S2 in the uv-plane of S1 and CC a connecting curve of VF. If SC and CC are intersected at the point IP, then IP is called an initial point of the intersection curve SC. As an example, in FIG. 3b, SC1 is an intersection curve of the two cylinders and CV1 is a connecting curve of VF. IP2 is the intersection point of SC1 and CV1. Hence, IP2 is an initial point of SC1.

One important problem in practice, is to identify all the initial points which lie on the curve SC. A method of computing all the initial points on SC can be described as follows:

First, we define a normal product value K(P). Let P be a point of SC and (P, Q) be the shortest distance pair of P. Then define $$k(P) = N1(P) \cdot N2(Q)$$

where K(P) is the dot product of N1(P) and N2(Q) and N1(P) (or N2(Q)) is the normal vector of S1 (or S2) at P (or Q).

If P is an initial point of SC has the following important property, then the normal product value K(P) at P is a local extremum on SC (i.e. K(P) is an extremum value in the neighborhood of P on SC). However, this is only a sufficient condition. On the other hand, if K(P) is an extremum value in the neighborhood of P, then P may not be an initial point of SC. Further checking of P is necessary. The following methodology can be used as a guideline for finding initial points.

(1) find the points IPi, i=1,2, ... on SC such that each IPi has a local extremum normal product value K(Pi) and (2) check which IPi are lying on the connecting curve of VF.

Again, notice that the terminology of initial points and the methodology of calculating initial points can be adopted into equal height curves, since an intersection curve is only a special case of an equal height curve.

The above section provides the fundamental methods of finding all the intersection curves. In certain applications such as NC machining, when two surfaces do not intersect, the distance between the two surfaces needs to be calculated by using the following method.

(h) Method of Selecting a Correct NC Tool Path.

Assume that S1 is a surface to be machined. In general, a cutter path on S1 is generated by the intersection of S1 and another surface S2 which contains the center axis of the cutter. If there exists only one intersection curve, then the tool path can be created easily. However, when the two surfaces S1 and S2 are not simple, there are two problems associated with finding the tool path (1) is to find all the intersection curves of S1 and S2, and (2) is to identify the right curve for the tool path. The first problem can be solved by the methodology described in (f). Now, let SCi, i=1,2, ..., be the set of intersection curves of S1 and S2 and assume that the cutter is initially located at at a point P of S1. To identify the correct tool path, first we find a point p on the uv-plane of S1 such that P is the image of p. Then determine which SCi, i=1,2, .., contains the point p. If SCj contains p, then SCj is the correct cutter path.

(i) Method of Calculating the Shortest Distance Between Two Surfaces

Let S1 and S2 be two surfaces of a solid geometric modeling system. Assume that S1 does not intersect S2. Then there exists a set of

*minimum pairs (Pi,Qi), i=1,2. . .* between S1 and S2. A minimum pair (Pi,Qi) has the same geometric property as a touching point. Hence, a minimum pair and a touching point of S1 and S2 can be found in a similar way. This can be also observed in FIG. 5b, if the sphere S2 is pulled away from the plane S1 with a distance d.

After all the minimum pairs have been found, the shortest distance between S1 and S2 is the shortest distance between all the minimum pairs (Pi,Qi), i=1,2, ... of S1 and S2.

(j) Tool Path Clearance Checking ("look-ahead" strategy).

Figure 14:
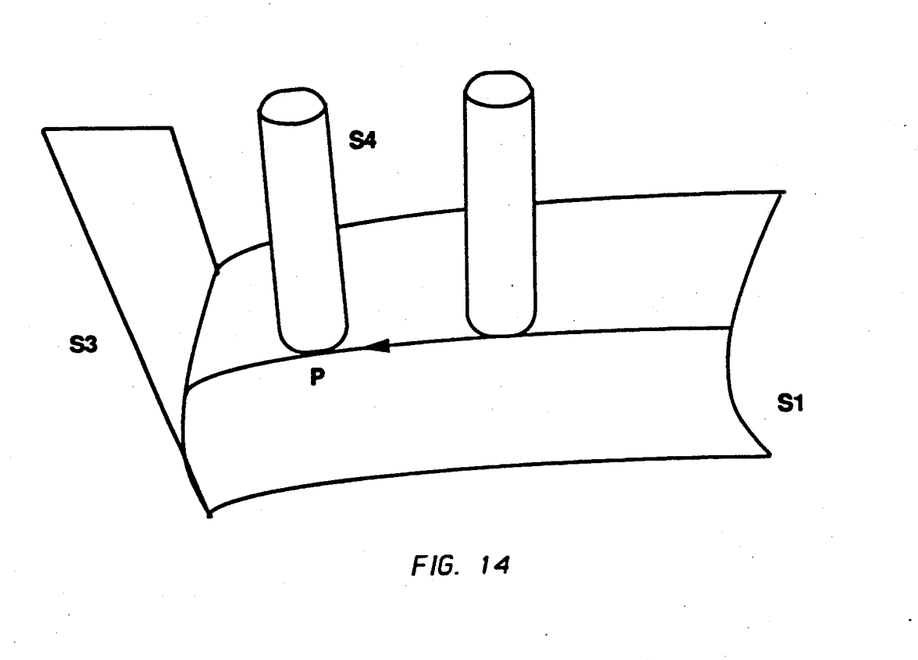
FIG. 14 is a cutter moves on a surface S1.

One of the most common problems in NC tool path generation is that the cutter cuts into the finishing surfaces of the part accidentally. The clearance between the motion of the cutter and the boundary faces of the part must be checked. To solve this problem, a "look-ahead" strategy can be built into the system to guide the motion of the cutter. The methodology is described as follows:

Assume that S1 is a surface to be machined Let SCj be a cutter path of S1 created in (h). Assume that the cutter is initially located at a point P of S1. Let S3 be the surface that the cutter may cut into it. Let p be the point on the uv-plane of S1 such that P is the image of p. Now, march p along the curve SCj. At each step, calculate the image P of p. Use (i) to find the distance d (clearance) between the cutter surface S4 at P and S3. The distance d shows how far the cutter is away from the surface S3. It is used to look ahead and guide the next move. Notice that this method works only when the absolute distance between two surfaces is calculated accurately. FIG. 14 illustrate the concept of the "look-head" methodology.

(k) Associated Vector Field.

Let S1 and S2 be two surfaces of a solid geometric modeling system and VF the vector field constructed in (6). The purpose of constructing VF is to locate all the intersection curves of S1 and S2. However, VF is not the only vector field which can be used to find the intersections. There are a number of other vector fields on the uv-plane of S1 which will yield the same result. The simplest example is to enlarge the length of the vectors of VF. The definition of associated vector field is provided here to demonstrate the equivalence of similar vector fields. Let GT be the global structure of the intersection curves generated by VF. Let VF' be another 2D vector field on the uv-plane of S1. If all the singular points of VF and VF' are similar, then VF' is called an associated vector field of VF. More specifically, let GT' be the global structure of the intersection curves generated by VF'. If VF' is an associated vector field of VF, then GT and GT' have the same graphical structure. In short, all the methodologies described above can be applied in the same manner to both vector fields.

While the method of the present invention has been described in the context of the presently preferred embodiment and the examples illustrated and described herein, the invention may be embodied in other specific ways or in other specific forms without departing from its spirit or essential characteristics. Therefore, the described embodiments and examples are to be considered in all respects only as illustrative and not restrictive. The scope of the invention is, therefore, indicated by the appended claims rather than by the foregoing description, and all changes which come within the meaning and range of equivalency of the claims are to be embraced within their scope.

What is claimed:

1. A method of using a solid geometric modeling system for finding all the intersection curves of two surfaces to support different functions performed by the system, said method comprising the steps of:

(a) inputting to a CPU two surfaces of a solid geometric modeling system, a set of intersection curves SCr, r=0,1, ..., of the said surfaces, a set of points SPq, q=0,1, ..., of an initial position of a NC cutter;

(b) said CPU defining one of the said surface as a master surface S1 and the other said surface as a slave surface S2;

(c) said CPU constructing a vector field VF on the uv-plane of the said master surface S1 where VF is said to be the induced vector field of the orthogonal components of the equal height curves from the said master surface S1 to said slave surface S2;

(d) when said input curve set SCr is empty, said CPU performing steps (e), (f) and (g);
    when said input curve set SCr is not empty, for each said curve SCr and CPU skip steps (e), (f) and (g);

(e) when the said input point set SPq is empty, said CPU construct a set of points SPq, q=1,2, ..., on the uv-plane of said surface S1;
    said CPU finding an initial intersection pair (P,Q) or relative minimum pair (P,Q) of said surface S1 and S2 by marching along a set of integral curves of the said vector field VF which pass through the said points SQq, q=1,2, ..., or marching along the boundary lines of the uv-plane of the said surface S1;

(f) said CPU calculating an intersection curve SC by using the said intersection pair (P,Q), if said (P,Q) is found in (d);

(g) said CPU calculating an equal height curve EH around P, by using the said minimum pair (P,Q), if said (P,Q) is found in (d);

(h) said CPU calculating the initial points IPi, i=1,2, ... on the said intersection curve Sc or on the said equal height curve EH:

(i) said CPU finding other intersection pairs (Pj, Qj), j=1,2,..., or relative minimum pairs (Pk, Qk), k= 1,2, ..., of said surface S1 and said surface S2 by marching along the connecting curves of the said vector field VF starting at the said point IFi;

(j) said CPU calculating new intersection curves SCm, m=1,2, ..., or new equal height curves EHn, n=1,2, ..., by using the said intersection pairs (Pj, Qj) or said minimum pairs (Pk, Qk);

(k) for each said intersection curve SCm or said EHn, said CPU repeating steps (h), (i) and (j) until no new intersection curves can be found;

(l) said CPU marching along the boundary of the uv-plane of the said surface S1 or the said surface S2 and calculating the intersection pairs (BPa, QPa), a=1,2, ..., or the relative minimum pairs (BPb, BPb), b=1,2, ..., of the said surfaces S1 and S2;

(m) said CPU calculating new intersection curves by using the said intersection pairs (BPa, BQa) found in step (1);

(n) said CPU using the said initial position of the cutter to select a correct curve from the said intersection curves found in steps (d)–(m) to generate a NC tool path; and (o) creating NC data from the said tool path for driving the said cutter .

(p) machining said surface S1 in accordance with said created NC data.

2. A method as defined in claim 1, wherein said CPU constructing an associated vector field VF' of the said vector field VF, wherein
    the said vector field VF' being used to replace the said vector VF, and wherein
    said CPU computing all necessary information from vector field VF' in the same way as processing the said vector field VF.

3. A method as defined in claim 2 wherein
    said method is not fixing said surface S1 as a master surface and said surface S2 as slave surface, and wherein said surfaces S1 and S2 are interchangeable as master and slave surfaces during the process.

4. A method as defined in claim 3 wherein said input to the CPU are two said surfaces, a set of said curves and a set of said points, and wherein said CPU using all the said intersection curves found in steps (d)–(m) to delete the designated portions from said surface S1 and to create a new boundary surface for the boundary file.

5. A method as defined in claim 3 wherein said input to the CPU are two said surfaces, a set of said intersection curves, a set of said points, the said initial position of a cutter and a set of surfaces S3i, i=1,2, ..., and wherein said method further composing the steps of:

moving the said cutter along the constructed said cutter path;

at each step, constructing the boundary surface S4 of the said cutter;

for each said surface S3i, using said S3i, said surface S4 and the set of said input points to process the steps (a)–(m);

if the two said surfaces S3i and S4 intersect, then the distance di between the two said surfaces is zero;

if the two said surfaces S3i and S4 do not intersect, then the said CPU computes the distance di by finding the minimum distance between the said found minimum pairs; and     Using the said distance values di, i=1,2, ... to "look-head" and guide the motion of the cutter.

6. A method of using a solid geometric modeling system for finding intersection curves of two surfaces to support different functions performed by the system, said method comprising the steps of:

(a) inputting to a CPU two surfaces S1 and S2 of a solid geometric modeling system, a set of points pi, i=0,1,2, ..., a set of curves Cj, j=0,1,2, ..., and an initial position of a NC cutter;

(b) said CPU constructing a vector field VF on the uv-plane of the said surface S1, where VF is said to be the induced vector field of the orthogonal components of the equal height curves from said surface S1 to said surface S2;

(c) said CPU finding intersection pairs (Pk, Qk), k=1,2, ..., or relative minimum pairs (Pm,Qm), m=1,2, ..., of said surface S1 and S2 by marching along integral curves of the said vector field VF which pass the said points pi, i=1,2, ...;

(d) said CPU calculating intersection curves SCk, k=1,2, ..., by using the said intersection pair (Pk, Qk), if said (Pk,Qk) are found in step (c);

(e) said CPU marching along the said input curves Cj, j=0,1, ..., and calculating the intersection pairs (BPa,QPa), a=1,2, ..., or the relative minimum pairs (BPb, BPb), b=1,2, ..., of the said surfaces S1 and S2;

(f) said CPU calculating new intersection curves by using the said intersection pairs (BPa, BQa) found in step (e);

(g) said CPU using the said initial position of the cutter to select a correct curve from the said found intersection curves to generate a NC tool path; and     (h) creating NC data from the said tool path for driving the said cutter     (i) machining said surface S1 in accordance with said created NC data; and 7. A method as defined in claim 6, wherein said CPU constructing an associated vector field VP' of the said vector field VF, wherein the said vector field VF' being used to replace the said vector VF, and wherein said CPU computing all necessary information from vector field VF' in the same way as processing the said vector field VF.

8. A method as defined in claim 7 wherein said input to the CPU are two said surfaces, a set of said points and a set of said curves and wherein said CPU performing steps (a)–(f) and using all the said intersection curves to delete the designated portions from said surface S1 and to create a new boundary surface for the boundary file.

9. A method as defined in claim 7 wherein said input to the CPU are two said surfaces, a set of said points, a set of said curves, the said initial position of a cutter, a set of surfaces S3i, i=1,2, ..., a set of points ppj, j=0,1,2, ..., and a set of curves PCk, k=0,1,2, ..., and wherein said method further composing the steps of:

moving the cutter along the constructed said cutter path; at each step, constructing the boundary surface S4 of the cutter;

for each said surface S3i, using said S3i, said surface S4, said points ppj, j=0,1,2, ... and said curves PCk, k=0,1,2, ..., to process steps (a)–(f);

if the two said surfaces S3i and S4 intersect, then the distance di between the two said surfaces is zero;

if the two said surfaces S3i and S4 do not intersect, then the said CPU computes the distance di by finding the minimum distance between the said found minimum pairs; and     Using the said distance values di, i=1,2, ... to "look head" and guide the motion of the cutter.

* * * * *